United States Patent
Olson et al.

[11] Patent Number: 5,902,998
[45] Date of Patent: May 11, 1999

[54] APPARATUS AND METHOD FOR DETECTING AN OBJECT USING DIGITALLY ENCODED OPTICAL SIGNALS

[75] Inventors: Gary R L Olson, Belle Plaine; Eardley L. Ham, Chaska; Andrew J. Pichotta, Minneapolis, all of Minn.

[73] Assignee: Control Products, Inc., Chanhassen, Minn.

[21] Appl. No.: 08/876,303

[22] Filed: Jun. 16, 1997

Related U.S. Application Data

[60] Provisional application No. 60/037,286, Feb. 4, 1997.
[51] Int. Cl.$^6$ ..................................................... G01V 9/04
[52] U.S. Cl. ..................... 250/221; 250/222.1; 340/555
[58] Field of Search ................................ 250/221, 222.1, 250/559.4, 214 B, 214 C; 340/555–557, 583; 356/375, 376

[56] References Cited

U.S. PATENT DOCUMENTS

| | | |
|---|---|---|
| 3,727,056 | 4/1973 | Enemark . |
| 3,731,496 | 5/1973 | Frazier . |
| 3,842,263 | 10/1974 | Kornrumpf et al. . |
| 4,202,387 | 5/1980 | Upton . |
| 4,282,430 | 8/1981 | Hatten et al. . |
| 4,306,147 | 12/1981 | Fukuyama et al. . |
| 4,437,499 | 3/1984 | Devale . |
| 4,747,516 | 5/1988 | Baker . |
| 4,822,996 | 4/1989 | Lind . |
| 4,973,834 | 11/1990 | Kim . |
| 5,002,102 | 3/1991 | Hösel . |
| 5,159,834 | 11/1992 | Eisele . |
| 5,164,606 | 11/1992 | Secord . |
| 5,245,177 | 9/1993 | Schiller . |
| 5,250,801 | 10/1993 | Grozinger et al. . |
| 5,324,931 | 6/1994 | Fooks et al. ........................ 250/222.1 |
| 5,491,333 | 2/1996 | Skell et al. . |
| 5,550,369 | 8/1996 | Skell et al. . |

*Primary Examiner*—Stephone Allen
*Attorney, Agent, or Firm*—Skinner And Associates

[57] ABSTRACT

A proximity detection apparatus for detecting objects within a predetermined region. The apparatus comprises a transmitter, a receiver, a microcontroller, and a power supply that provides electrical potential to the transmitter, the receiver, and the microcontroller. The microcontroller produces transmitted data bursts to the transmitter, the transmitter emits optical data bursts toward the predetermined region where, if the object is present, the optical data bursts reflect off of the object as return optical bursts. The receiver detects the return optical bursts and transmits received data bursts to the microcontroller. The microcontroller compares the received data bursts against the transmitted data bursts to verify that the object is present in the predetermined region. The microcontroller produces an output signal to control equipment based the object being present or absent from the predetermined region.

34 Claims, 13 Drawing Sheets

APPARATUS AND METHOD FOR DETECTING AN OBJECT USING DIGITALLY ENCODED OPTICAL SIGNALS

CROSS-REFERENCE TO RELATED APPLICATIONS, IF ANY

This application claims the benefit, under 35 U.S.C. 119(e), of U.S. provisional application Ser. No. 60/037,286, filed Feb. 4, 1997.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF TH BE INVENTION

1. Field of the Invention.

The present invention relates, generally, to object proximity detection methods and apparatus. More particularly, the invention relates to object proximity detection methods using an optical sensor system that transmits and receives light radiation or optical signals. The optical signal may be steady-state, pulsed, digitally encoded, or a sequenced combination of the foregoing. The invention provides a means to control a variety of devices or processes based upon the presence or absence of an object within some predetermined distance from or orientation to a fixed sensor. An object is detected by transmitting digital data bursts of light radiation from a remote optical energy transmitter and verifying the error-free return of the digital data bursts into an optical energy receiver. The verification of the error-free return of the transmitted data bursts provides proof that, depending on the design of the sensor system, an object is either present and has reflected the optical energy into the receiver or is absent and has not blocked the optical energy from being received into the receiver.

The apparatus and methods of this invention have particular utility used in conjunction with commercial and institutional food service beverage and ice dispensing systems, medical/pharmaceutical dispensing systems, automated manufacturing and production systems, food processing systems, packaging systems, and a variety of other commercial, industrial, municipal and residential systems that utilize one or more mechanical, electronic, optical, or similar sensors in their operations.

2. Background Information.

The primary difficulty with using optical signals for object detection is distinguishing valid signals from ambient light energy noise. This invention employs digital data error detection principles to insure that the received signal accurately indicates the presence or absence of an object.

Noise rejection or avoidance in optical sensor systems has usually been attacked using one of two methods. The first method simply looks for "clean" time slots without noise and transmits signals during these clean time slots. The second method transmits a master-clocked continuous pulsed signal and a corresponding master-clocked synchronous signal, and verifies that the received signal exactly matches both the transmitted pulsed and synchronous signals. These described methods for rejecting or avoiding noise in optical sensor systems are generally disclosed in the following United States patents: Skell et al, U.S. Pat. No. 5,550,369; Skell et al., U.S. Pat. No. 5,491,333; Grozinger et al., U.S. Pat. No. 5,250,801; Schiller, U.S. Pat. No. 5,245,177; Kim, U.S. Pat. No. 4,973,834; Hatten et al, U.S. Pat. No. 4,282,430; Hösel, 5,002,102; Fukuyama et al., U.S. Pat. No. 4,306,147; Devale, U.S. Pat. No. 4,437,499; and Upton, U.S. Pat. No. 4,202,387.

This invention differs significantly from known art. No attempt is made to pre-filter the noise to a relatively low level with respect to the signal nor to identify "clean" time slots in which to transmit a signal. Moreover, this method does not depend on a master clock, a continuous pulsed signal, or a corresponding synchronous circuit. Rather, the present invention transmits a burst of digitally encoded data as required to control the equipment, system, or process that is the object of the design. Furthermore, both the data content and period between bursts are varied. This asynchronous transmission of digitally encoded data provides an effective method for distinguishing valid signals from ambient light energy noise.

An object of the invention is to provide a touchless, economical and reliable object proximity device using an optical sensor system. It is a further object of the invention to verify the presence of an object within a predetermined area using principles of digital data transmission, reception and error detection.

BRIEF SUMMARY OF THE INVENTION

The present invention provides a proximity detection apparatus and method for transmitting and receiving an asynchronous, digitally encoded data stream using an optical sensor system. This invention, unlike the known art, uses the principals of digital data transmission, reception, and error detection to verify the presence or absence of an object within a predetermined area. An infrared data transmitter generates an optical data stream that, depending on the design of the system and the presence or absence of an object, may be received into an infrared data receiver. This detection scheme is highly tolerant of external noise that may be caused by modulating light sources, randomly occurring optical noise, and ballast-driven fluorescent lighting. Furthermore, by using a suitable microcontroller or microprocessor, the asynchronous data transmission used in this scheme nearly eliminates the dedicated hardware and electronics required by other noise filtering schemes. In addition, the infrared transmitter and receiver may be located at some distance from the microcontroller or microprocessor by incorporating data line drivers.

The data transmitter and receiver operate in the infrared spectrum. A light emitting diode (LED) serves as the data transmitter and two photo transistors serve as the data receiver. A software program operating within the microcontroller controls the operation of the data transmitter and receiver. In a preferred embodiment, the transmitter emits an infrared data stream toward a predetermined region which may contain an object. If an object is within the region, the surface of the object reflects the data stream back into the receiver. The microcontroller compares the received digital data to the transmitted digital data. If the received digital data exactly matches the transmitted digital data, the presence of an object in the detection region is verified. However, if the received digital data does not exactly match the transmitted digital data, then the presence of an object within the detection region is not verified and it is assumed that the received digital data was produced by an external source of interfering noise. In addition, if no digital data is received after a transmission, then no object was within the defined region to reflect the transmission.

This detection scheme uses a method of error checking similar to traditional full-duplex data transmission, in which a remote device in communication with a computer echoes any data received from the computer immediately back to the computer. The computer, having received exactly the same data as it transmitted, has a reasonable expectancy that the remote device received error-free data. In this embodiment, the echo is caused by the reflection of the transmitted data by an object in the detection region. Because the detection signal is bit-oriented digital data rather than a fixed frequency pulse, more rigorous error detection methods may be invoked to further improve the rejection of externally-generated optical noise. This invention also includes a threshold stage in the receiver's circuit whereby most steady state or DC-level noise caused by steady-state ambient light can be rejected.

An advantage of this invention over the known art is the elimination of the following elements: a synchronous circuit required to insure the received signal is not confounded by optical noise; an oscillating circuit required to generate the signal pulse train; and a master clock required to coordinate the synchronous circuit output, the oscillating circuit output, and the comparison circuit input. In addition the digital data transmission, reception and error checking of the present invention provide increased resistance to periodic noise and inherent resistance to random optical noise. Furthermore, the present invention does not pre-scan for possible optical interference. A single low cost microcontroller performs the control f unctions of the present invention.

The features, benefits and objects of this invention will become clear to those skilled in the art by reference to the following description, claims and drawings.

DETAILED DESCRIPTION

Figure 1:
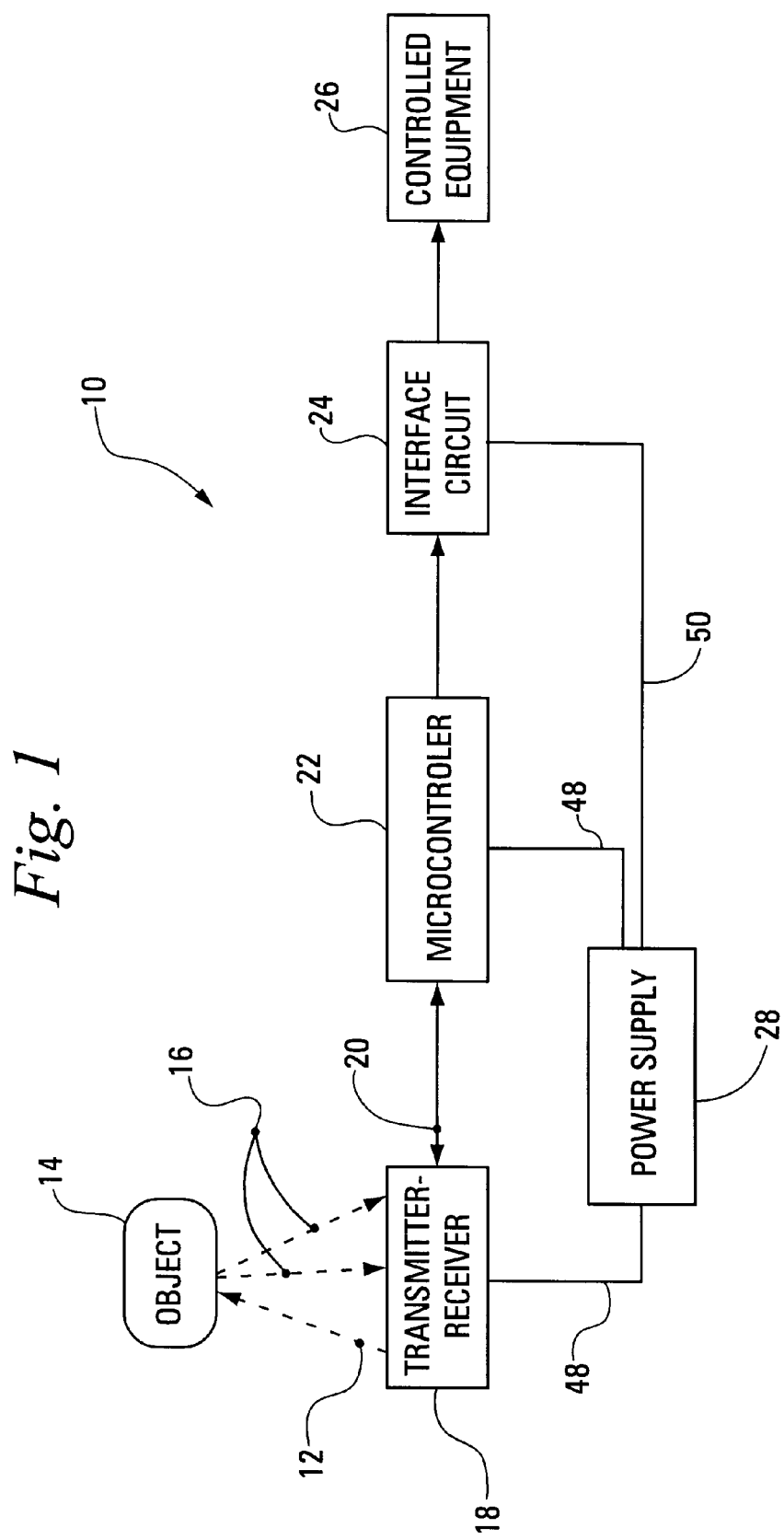
FIG. 1 illustrates a diagram of the circuitry of the present invention.

A block diagram of the preferred embodiment of the present invention is shown in FIG. 1. The object proximity detection apparatus 10 transmits digital data bursts of optical energy pulses 12, which if reflected from an object 14 as return digital data bursts 16 and verified as exactly replicating the transmitted digital data bursts 12, indicate that the object 14 is within a predetermined region defined by the design of the infrared transmitter/receiver unit 18. The infrared transmitter/receiver unit 18 communicates over a bidirectional asynchronous serial data link 20 with a microcontroller 22 or microprocessor. The microcontroller 22 uses a suitable interface circuit 24 to influence the controlled equipment 26, system or process. A regulated power supply 28 powers the transmitter/receiver unit 18, microcontroller 22, and interface circuits 24. A real-time control program operates within the microcontroller 22. The control program sends, receives, and validates serial multi-bit digital data to and from the transmitter/receiver unit. The software is described in more detail after the rest of the invention is disclosed.

Figure 2:
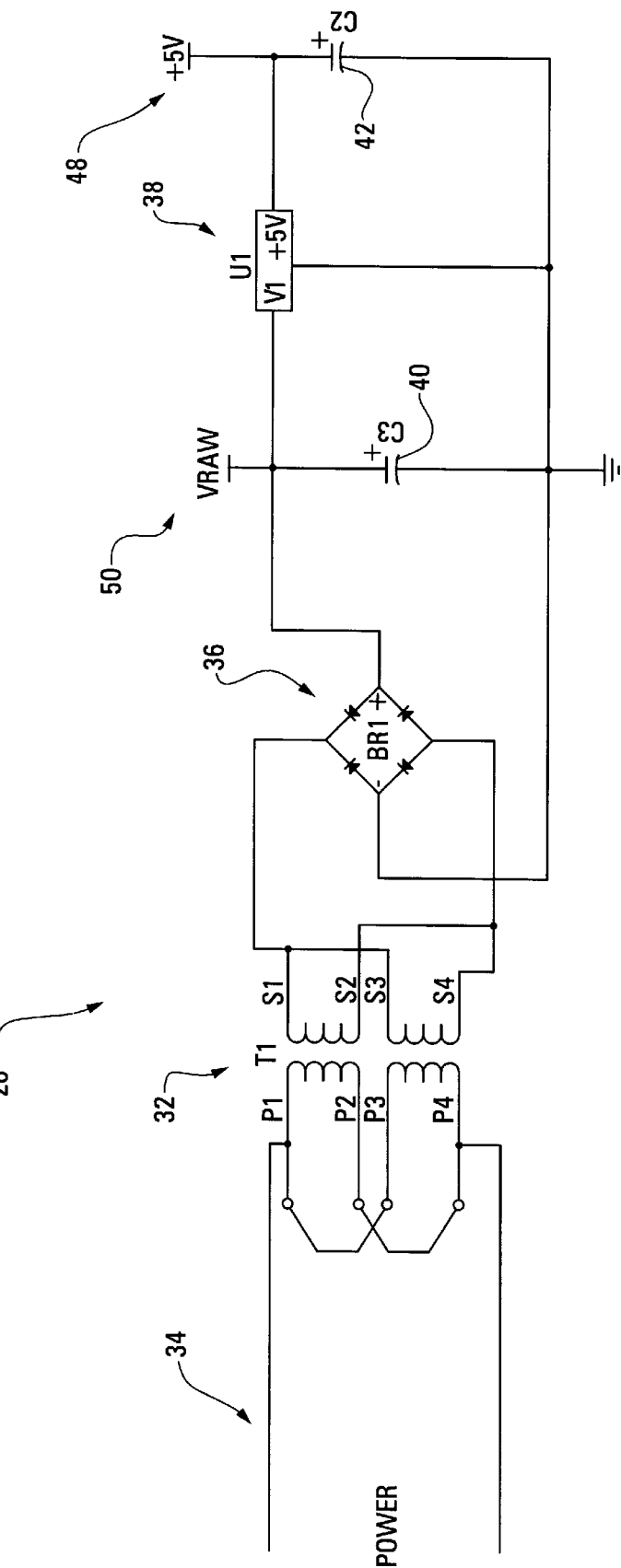
FIG. 2 illustrates the regulated power supply shown in FIG. 1.

A traditional, low-cost regulated power supply 28 is shown in FIG. 2. It includes a transformer 32 which reduces 120 or 240 VAC power 34 to 12VAC, a full-wave rectifier bridge 36 which converts the 12VAC to 12VDC, and an integrated circuit voltage regulator 38 which, with filter capacitors 40 and 42, provides a constant output potential 48 of five volts to power the transmitter/receiver unit 18 and the microcontroller 22. The power supply 28 also provides unregulated 12VDC or VRAW 50 to power the load relays 52 in the interface circuit 24.

Figure 3:
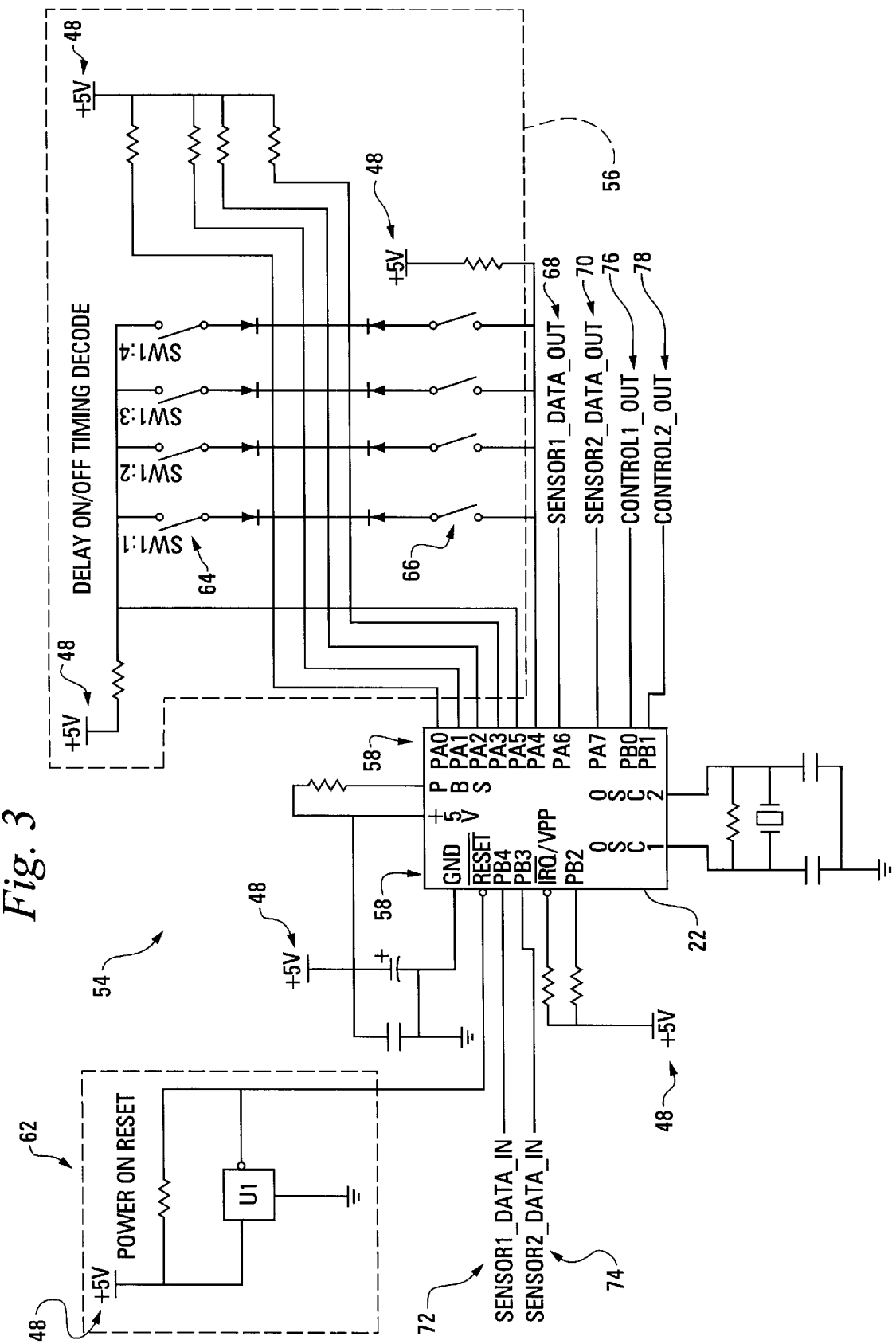
FIG. 3 illustrates the related circuitry for the microcontroller shown in FIG. 1.

A microcontroller circuit 54 is depicted in FIG. 3. It is designed to support two transmitter/receiver units 18 and to provide on/off control to two interface circuits 24. As shown in FIG. 3, the sensor data input/output function uses individual port pins 58, each of which is programmed as an input or output via a data direction register within the microcontroller 22 during initialization. Likewise, the control outputs are driven via individual port pins 58, also programmed as outputs during initialization. The microcontroller 22 has a reset circuit 62 that insures a stable initialization on power-up by holding pin U2:RESET low until the regulated supply voltage 48 rises above a predetermined threshold. This microcontroller circuit 54 also allows, by virtue of the DELAY ON/OFF TIMING DECODE section 56, a system-wide selectable on delay and selectable off delay operation. On initialization, the selectable delay timings used by the control program are established by scanning the DELAY ON/OFF TIMING DECODE section 56. Two four-bit binary numbers (from $0-15_{10}$), representing the open/closed patterns of the selectable on delay switches 64 and the selectable off delay switches 66, function as an index for a table of predetermined on delay and off delay times. The microcontroller 22 forms the four-bit binary value for the on delay time by manipulating and reading the logic state of the port pins 58 connected to the on delay switches 64. First, pin U2:PA3 is pulled low and the state of pin U2:PA5 is tested. If pin U2:PA5 is low, then switch SW1:4 is closed and yields a binary "0." If pin U2:PA5 is high, then switch SW1:4 is open and yields a binary "1." Pin U2:PA3 is then driven high again before decoding the next switch. The process is repeated using the U2:PA2/U2:PA5 pin pair to decode switch SW1:3, the U2:PA1/U2:PA5 pin pair to decode switch SW1:2, and the U2:PA0IU2:PA5 pin pair to decode switch SW1:1. Likewise, pin U2:PA4 and pins U2:PA3-U2:PA0 are used to decode the off delay switches 66 and form a four-bit binary number to index a table of predetermined off delay times.

SENSOR 1_DATA_OUT 68 and SENSOR2_DATA_OUT 70 transmit serial data to each of two transmitter/receivers units 18. A multi-bit data burst is formed by toggling the appropriate port pin U2:PA6 or U2:PA7, wherein a high output is driven for a binary "1" and a low output is driven for a binary "0." The bit timing is predetermined by program constants which set approximately a fifty microsecond delay between bit outputs. The data source is determined by the control program, embodiments of which are described in more detail below.

SENSOR1_DATA _IN 72 and/or SENSOR2 _DATA -IN 74 receive serial data from the two receiver/transmitter units 18. Bits are read serially by testing the state of pin U2:PB3 and/or pin U2:PB4 immediately after each bit transmit/delay sequence. A received bit is considered valid only if it matches the transmitted bit. A valid_bit_counter, initialized to 0, is incremented for each valid reception. Thus, the transmission of an eight-bit data burst is considered valid if and only if the valid_bit_counter value is equal to eight.

Figure 4:
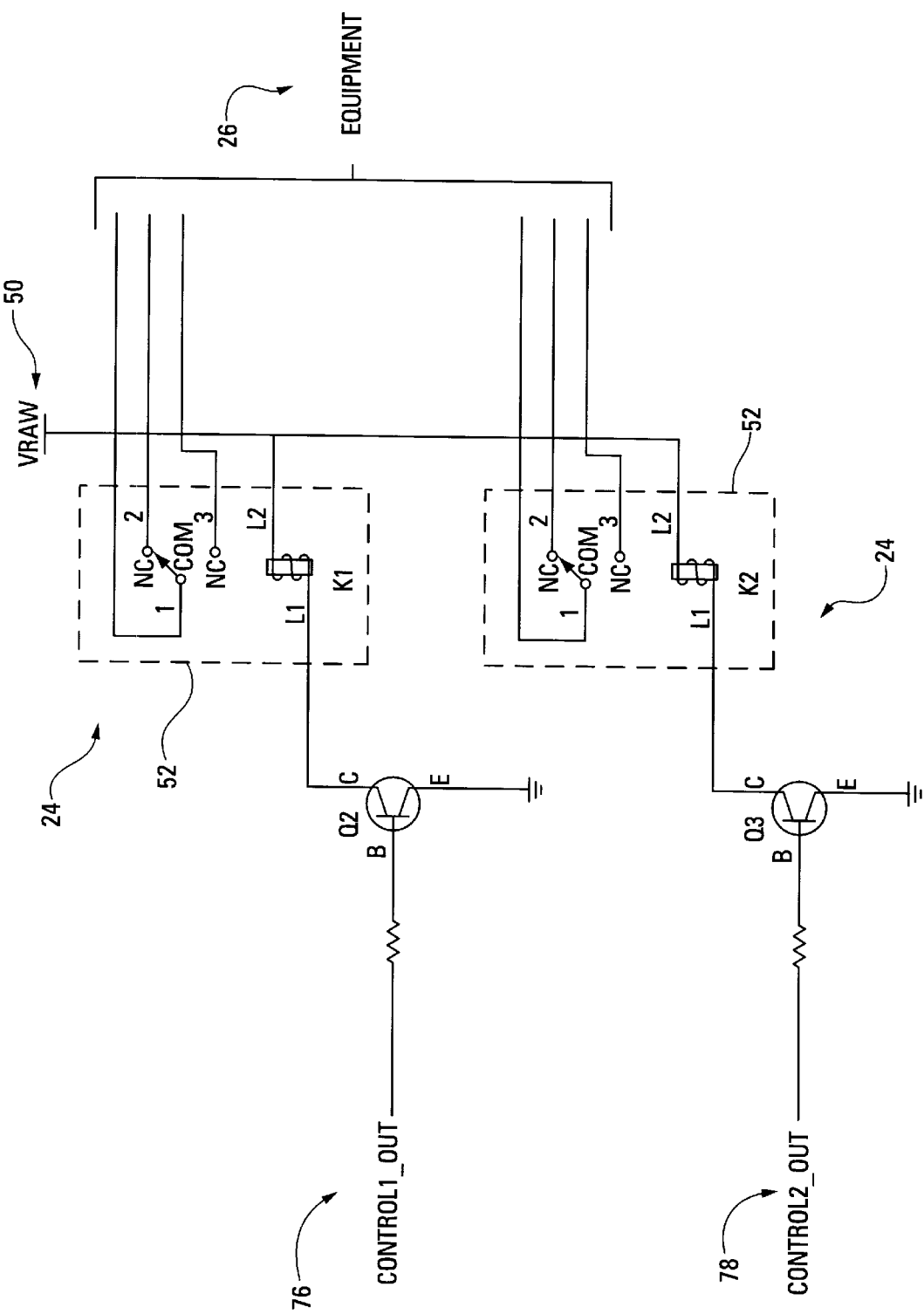
FIG. 4 illustrates an example of the interface circuit shown in FIG. 1.

Outputs to the interface circuit, CONTROL1_OUT 76 and CONTROL2_OUT 78, are controlled by the microcontroller program as required by the control application. As shown in FIG. 4, CONTROL1_OUT 76 and CONTROL2_OUT 78 are each electrically connected to an interface circuit 24, which is connected to the controlled equipment 26. The design of the interface circuit 24 is specific to the type of equipment 26 or system to be controlled and process to be performed. FIG. 4 illustrates an interface circuit 24 that uses load relays 52.

Figure 5:
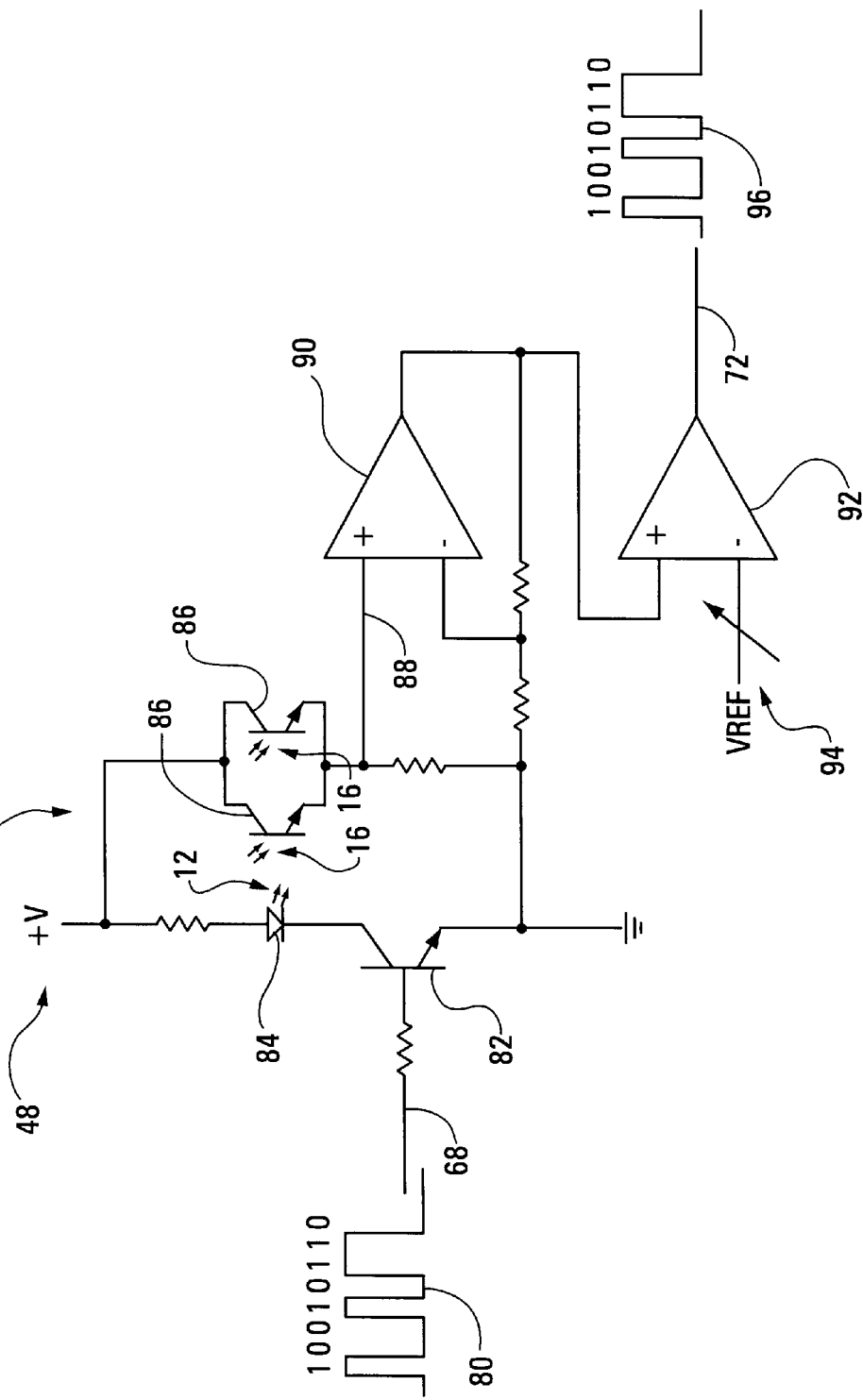
FIG. 5 illustrates the sensor circuit of the transmitter/receiver unit of FIG. 1.

FIG. 5 shows the electronic circuits employed with the transmitter/receiver unit 18. The data pattern 80, transmitted by the microcontroller 22 on SENSOR1_DATA_OUT 68 for example, controls transistor 82 as a low-side switch and causes intermittent or pulsed current to flow through the infrared transmitter or LED 84. The intermittent current causes the LED 84 to produce a pattern of optical bursts 12 that corresponds to the data pattern 80 in such a manner that infrared energy is emitted from the LED 84 when the SENSOR1_DATA_OUT 68 is high and is not emitted from the LED 84 when SENSOR1_DATA_OUT 68 is low. Thus, the timing and duration the pattern of the optical bursts 12 emitted by the LED 84 replicates the digital data pattern 8 9, The reflected infrared energy 16 is received by and controls photo transistors 86 as high-side switches. The photo transistors 86 pull the output data line 88 high when infrared energy 16 is detected and allow the output data line 88 to go low when infrared energy 16 is not detected. An amplifier 90 conditions and shapes the individual data signals transmitted to the comparator 92 which, via an adjustable reference level 94, provides a lower threshold or cutoff of low level signals (typically optical noise detected by the photo transistors 86). The photo transistors 86 receive a pattern of infrared bursts 16 that correspond to the data pattern 80 only when the infrared energy 16 is reflected from the surface of an object 14 within the predetermined region. The output data line, or SENSOR1_$_{DATA}$_IN 72 for example, transmits digital data pattern 96 back to the microcontroller 12 for comparison to the transmitted digital data 80.

Optical noise such as external light sources may cause the photo transistors 86 to switch on and off, which produces electrical noise on SENSOR1_DATA_IN 72. This noise is effectively filtered out by the control program operating within the microcontroller 22 by comparing and verifying the received digital data 92 against the transmitted digital data 80. Methods used by the control program to detect and filter optical noise are disclosed in greater detail below.

Figure 6:
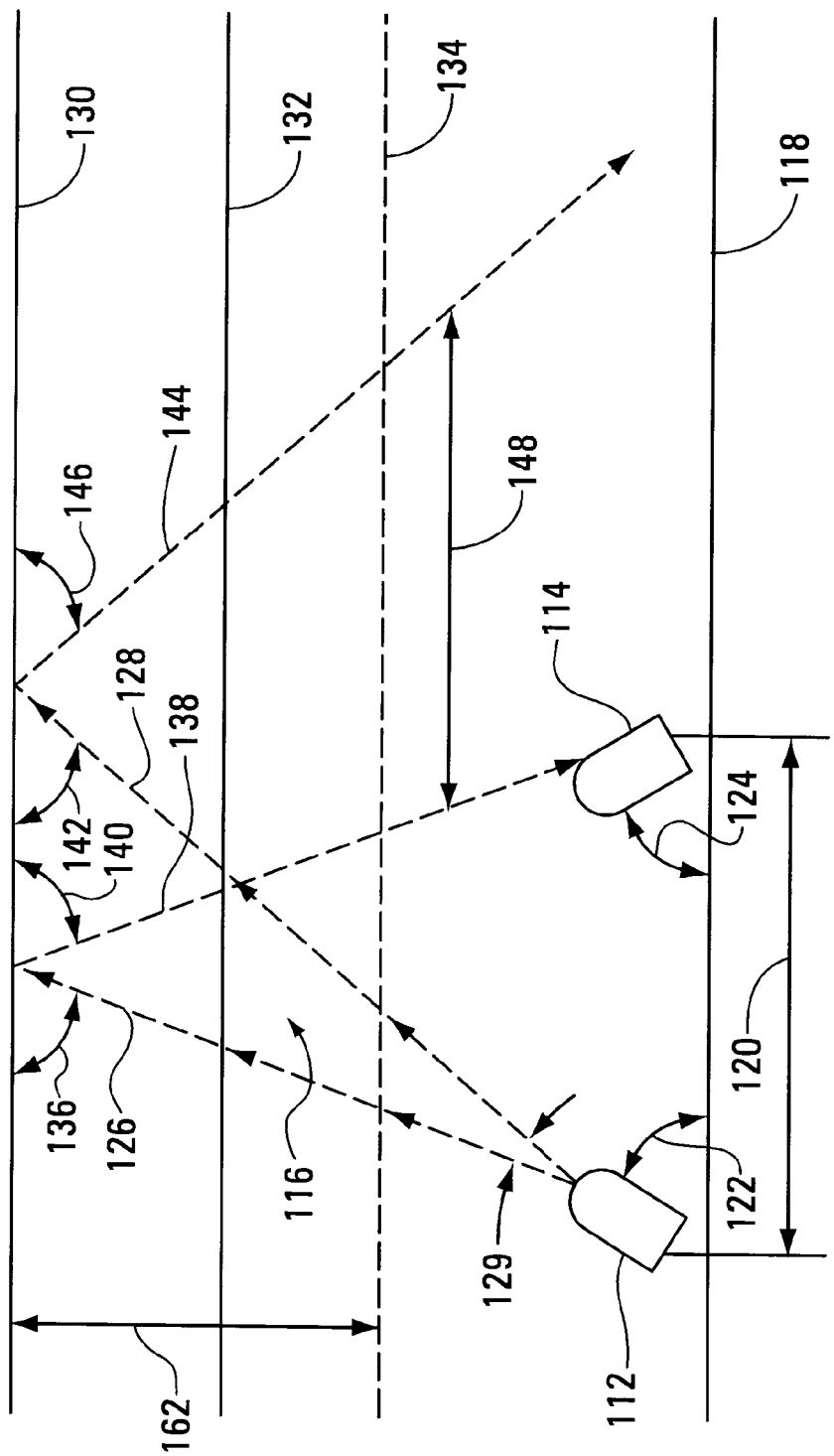
FIG. 6 illustrates the transmitter/receiver arrangement in relation to the outer reflection plane predetermined region.
Figure 7:
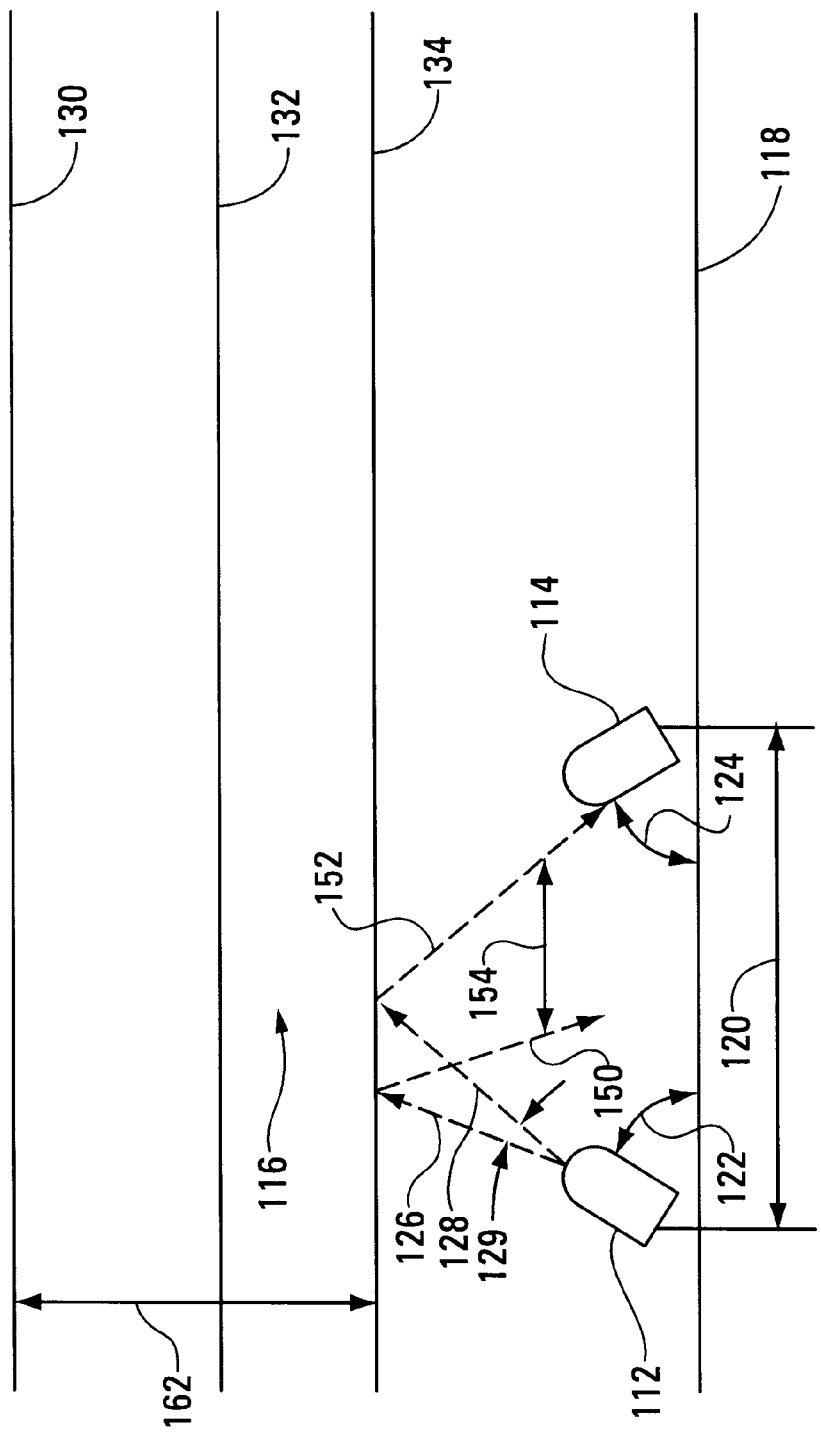
FIG. 7 illustrates transmitter/receiver arrangement in relation to the inner reflection plane Of the predetermined region.
Figure 8:
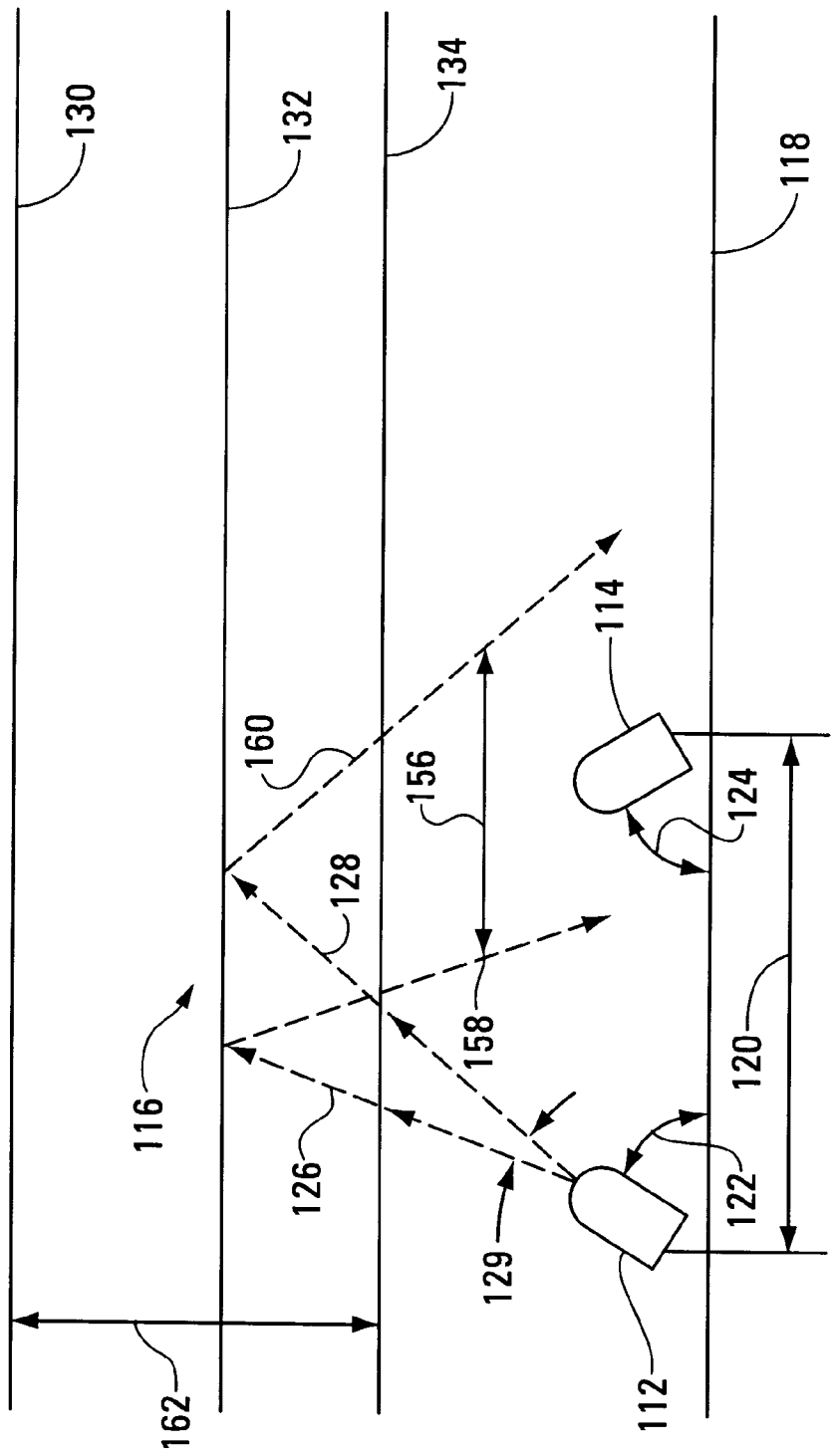
FIG. 8 illustrates the transmitter/receiver arrangement in relation to a reflection plane within the predetermined region.

As shown in FIGS. 6–8, the infrared transmitter 112 and receiver 114 detect objects 14 within a predetermined region 116. In a preferred embodiment, one infrared transmitter 112 and one infrared receiver 114 are positioned near a reference plane 118. The transmitter 112 and receiver 114 are positioned at a predetermined distance 120 from each other and at predetermined angles 122 and 124 to the reference plane 1 18. The angles 122 and 124 are approximately fifty-two degrees in this embodiment. The transmitter 112 emits a beam of infrared energy 12 in a more-or-less conical pattern as defined by beam boundaries 126 and 128. The beam angle 129 is dependent upon the design of the transmitter 112 and is approximately seventeen degrees in this embodiment. Reflection planes 130, 132, and 134 represent surfaces of an object 14 which reflect the infrared energy 16 back toward the receiver 114.

As shown in FIGS. 6 and 7, the predetermined region 116 is defined by an outer reflection plane 130 and an inner reflection plane 134. When beam boundary 126 strikes a surface represented by outer reflection plane 130 at an angle 136, it reflects back as return beam boundary 138 at angle 140, which is equal to angle 136. In a like manner, beam boundary 128 strikes the surface represented by the outer reflection plane 130 at angle 142 and is reflected back toward receiver 114 as beam boundary 144 at angle 146, which is equal to angle 142. The returned cone of light energy has a beam spread 148 wherein the return boundary beam 138 falls just to the right of receiver 114. Since receiver 114 is not within the region defined by the beam spread 148, it will not detect the presence of an object 14 positioned at or further than reflection plane 130 from the transmitter 112 and receiver 114.

Referring to FIG. 7, when beam boundary 126 strikes a surface represented by the inner reflection plane 134, it reflects back as return beam boundary 150. In a like manner, beam boundary 128 strikes the surface represented by reflection plane 134 and is reflected back toward receiver 114 as return beam boundary 152. The returned cone of light energy has a beam spread 154 wherein the return boundary beam 152 falls just to the left of receiver 114. Since receiver 114 is not within the region defined by the beam spread 154, it will not detect an object 14 positioned at or closer than the inner reflection plane 134.

FIG. 8 illustrates the reflection off of an object 14 within the predetermined region 116. It shows the receiver 114 positioned within the beam spread 156 defined by return boundary beams 158 and 160. Therefore, the receiver 114 will detect an object 14 positioned at reflection plane 132. The depth 162 of the predetermined region 116, which is in this embodiment approximately 1.5 inches, is determined by the distance between the inner 134 and outer 130 reflection planes. A surface located anywhere within the redetermined region 116 will reflect a beam emitted by transmitter 112 onto receiver 114.

Referring again to FIG. 6, if the mounting distance 120 between transmitter 112 and receiver 114 is increased, receiver 114 will be within beam spread 148, allowing it to detect an object 14 positioned at or beyond outer reflection plane 130. Referring again to FIG. 7, if the mounting distance 120 is decreased, receiver 114 will be within beam spread 154, allowing it to detect an object 14 positioned at or closer than the inner reflection plane 134. Therefore, the predetermined region 116 may be moved further from or closer to the transmitter 112 and receiver 114 by adjusting the mounting distance 120 between the transmitter 112 and receiver 114. The depth 162 of the region 116 may be altered by changing the angle 122 of the transmitter and the angle 124 of the receiver 114. Increasing angles 122 and 124 will increase the depth 132 of the predetermined region 116. Decreasing angles 122 and 124 will decrease the depth 132 of the region 116.

Figure 9:
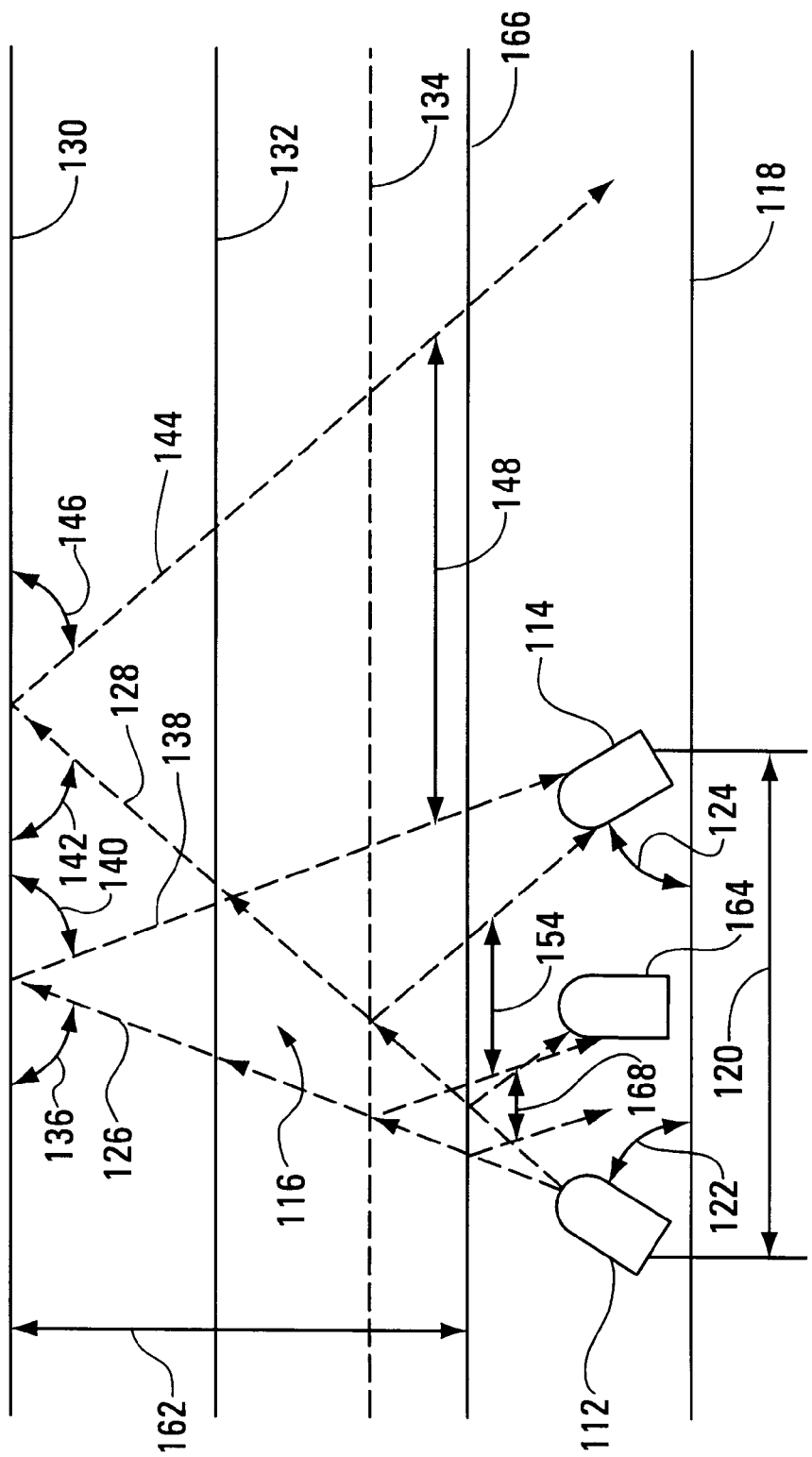
FIG. 9 illustrates an embodiment of the present invention that utilizes a second receiver increase the depth of the predetermined region.

If the dimensions of the region 116 are such that altering the mounting distance 120 or angles 122 and 124 is not adequate, a second receiver 164 may be mounted between the transmitter 112 and receiver 114 as shown in FIG. 9. The second receiver 164 is positioned within beam spread 154 and allows an object 14 closer than the inner reflection plane 134 to be detected without affecting the maximum detection distance identified by the position of the outer reflection plane 130. The depth of the predetermined region 162 is increased to the distance between reflection planes 130 and 166.

Figure 10:
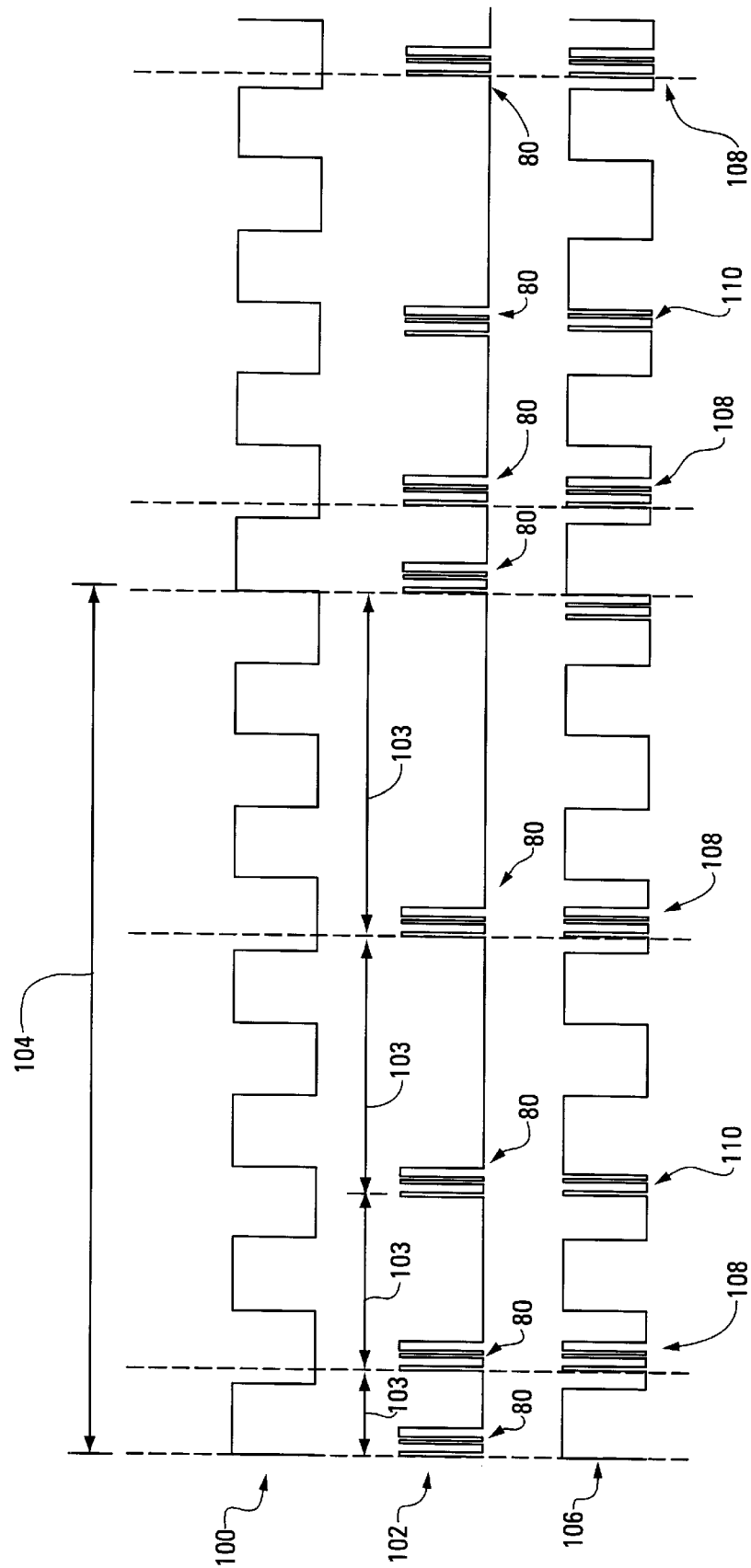
FIG. 10 illustrates a timing diagram for a first digital error detection method, wherein the timing diagram shows typical optical noise signals, transmitted data signals sent at gradually increasing intervals while sweeping a periodic time band, and the combination of the noise and data signals.
Figure 11:
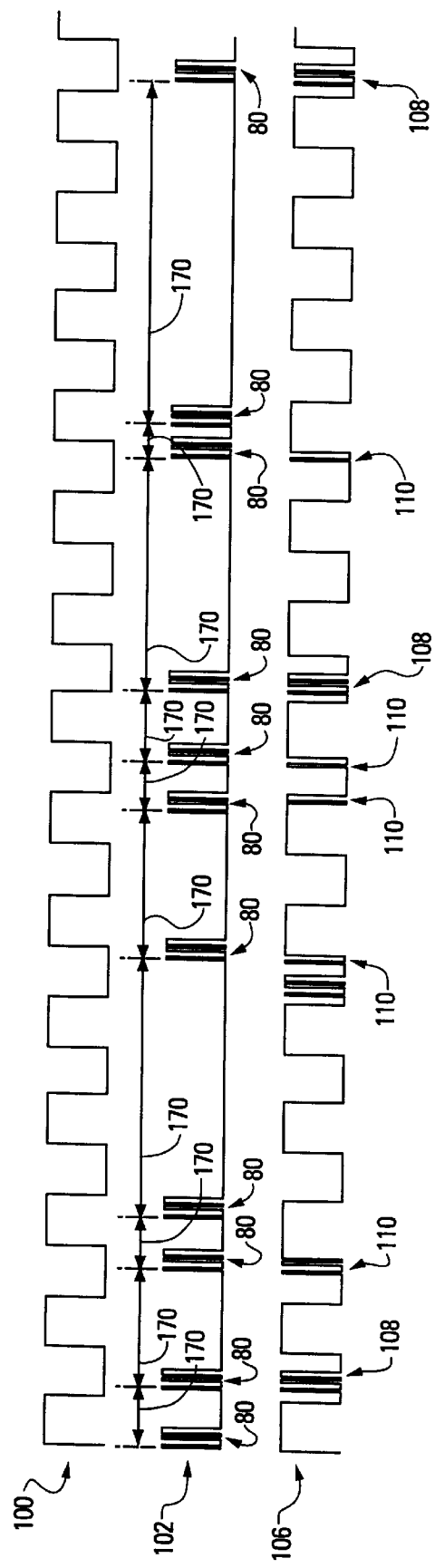
FIG. 11 illustrates a timing diagram for a second digital error detection method, wherein the timing diagram shows typical optical noise signals, the transmitted data signals sent at random intervals, and the combination of the noise and data signals.

The present invention can detect and filter optical noise using multiple digital error detection methods. Two preferred embodiments or methods are described below. The noise either may be steady (DC level) noise caused by direct or reflected light from steady sources such as sunlight and incandescent lights, or it may be intermittent noise caused by modulated lighting such as ballast-driven fluorescent lighting. Referring to FIGS. 10 and 11, noise 98 caused by fluorescent lighting typically results in noise signal 100 that approximates a 120 Hz. square wave. In the first method for filtering out noise shown in FIG. 10, the microcontroller 22 transmits a series of short digital data bursts 80 shown as signal 102, the intervals 103 of which are gradually increased while sweeping a periodic time band 104. If the transmitted signal 102 is reflected by an object 14 in the predetermined region, the combination of the noise signal 100 and the transmitted signal 102 results in signal 106. Valid digital data 108 is detected and verified by the microcontroller 22 when a noise signal 100 is not present. Invalid digital data 110 is detected when a noise signal 100 is present. An object 14 is detected when the microcontroller 12 verifies valid digital data 108 and is ignored when the microcontroller 12 receives invalid digital data 110. The transmitted signal interval 103 is reset and the sweeping begins as before at the beginning of each periodic time band 104. The rate of increase of the data burst interval is varied so as not to be harmonic with noise signal 100. In the second method for filtering out noise shown in FIG. 11, the microcontroller generates and transmits bursts of data at random intervals 170. The term "random," as used in the application, incorporates computer generated "pseudo random" numbers produced through algorithms. The transmission of data at random intervals avoids duplicating the frequency or any harmonic frequencies of the noise signal 100.

Figure 12:
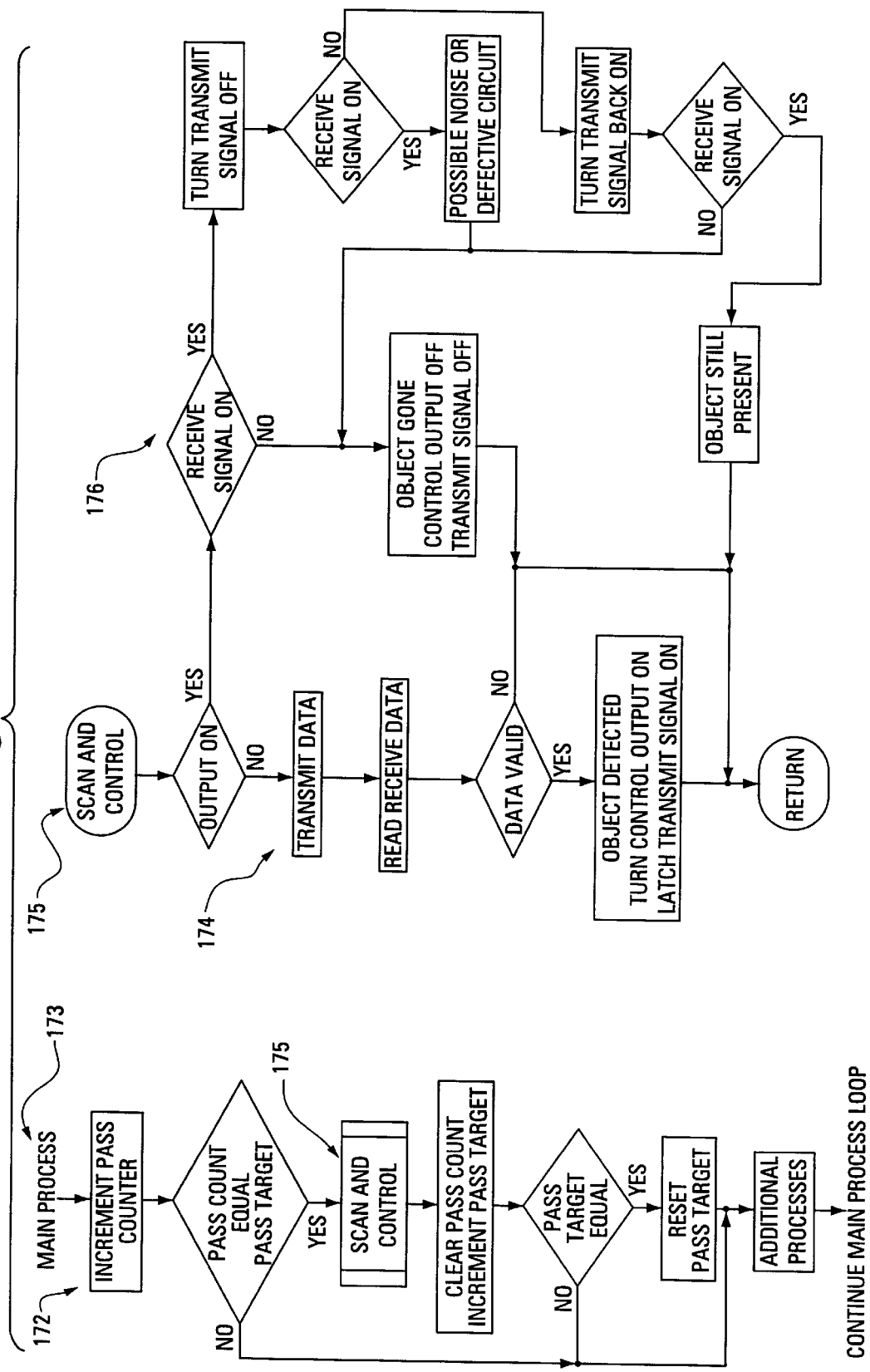
FIG. 12 illustrates a flow diagram of the first software routine used for the first digital error detection method shown in the timing diagram of FIG. 10, wherein said software routine sends, receives, and validates digital data.
Figure 13:
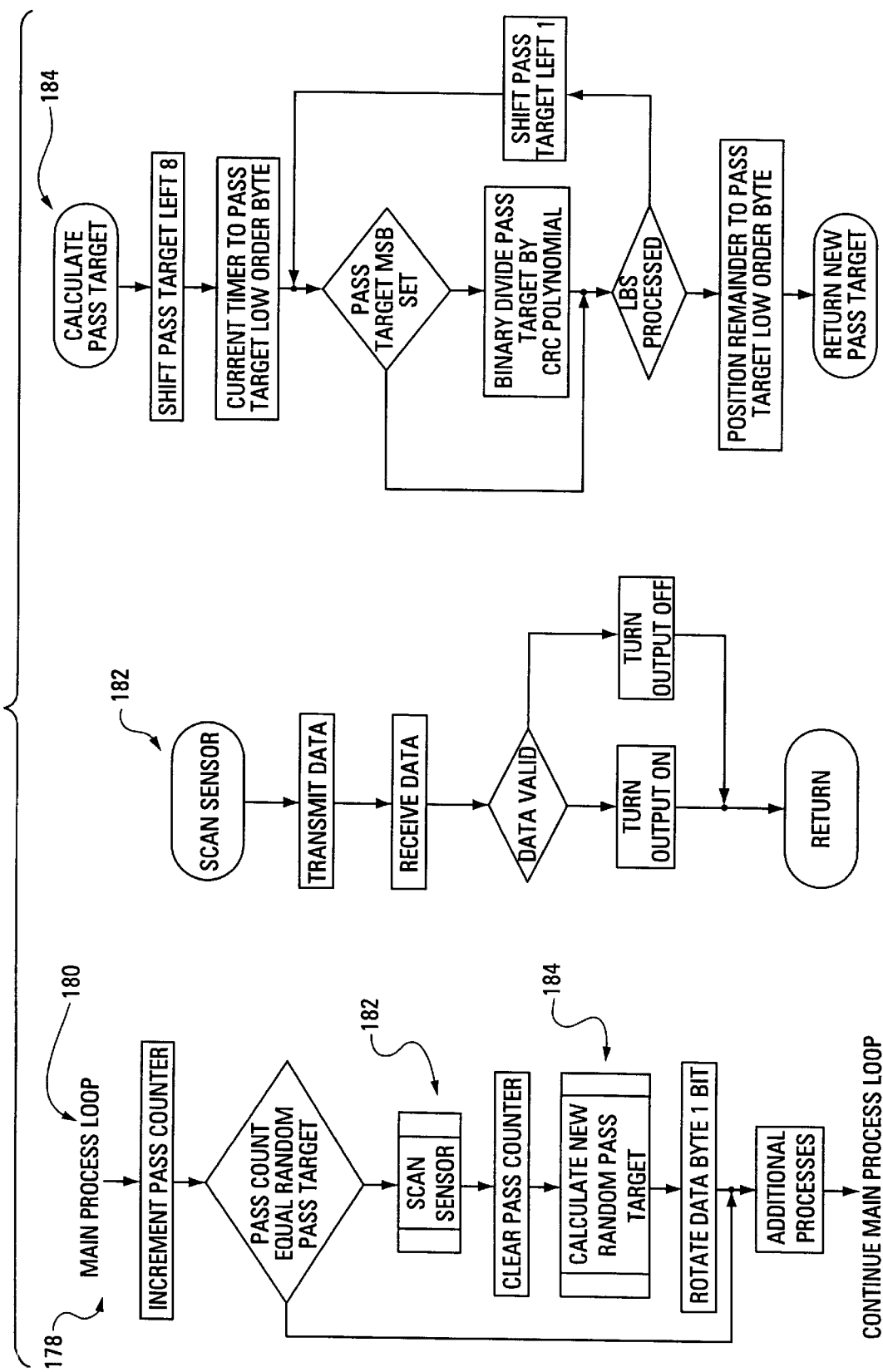
FIG. 13 illustrates a flow diagram of the second software routine used for the second digital error detection method shown in the timing diagram of FIG. 11, wherein said software routine sends, receives, and validates digital data.

The first software routine 172 used in the first method of digital error detection is illustrated in the flow diagram of FIG. 12. This routine 172 includes a Main Process loop 173 that calls a Scan and Control sub process 175 that basically operates within either a Scan Sensor Module 174 or a Latch Module 176. The Main Process loop 173 contains an interval generator function that determines the interval 103 between successive scans or generated data bursts 80. The interval generator sweeps aperiodic time band 104 by setting a pass target number to zero and incrementing the pass target number after each scan until the pass target number equals 63. When the pass target number is incremented to 64, it is reset to zero to start sweeping a new periodic time band 104.

In the Scan Sensor Module 174, the microcontroller sends the transmitted bursts of digital data, receives digital data, and checks or verifies that the received data is valid by comparing it to the transmitted bursts of digital data. If the data is not valid either because of noise or the because the object is not present, the microcontroller continues to operate in the Scan Sensor Module 174 and transmit bursts of digital data. If the data is valid because the object is present, the microcontroller turns the control output on and enters the Latch Module 176 by transmitting steady state signals rather than bursts of digital data.

In the Latch Module 176 the microcontroller toggles its transmit signal on and off and checks the resulting receive signal to determine whether the object is still present, the receiver is detecting noise, or the object is not present. The microcontroller stays in the latch module 176 when the object is still present. When the object is not present or the receiver is detecting noise, the microcontroller turns the control output off and returns to the scan sensor module 174 where it transmits bursts of digital data rather than steady state signals. The microcontroller determines that an object is still present if the receive signal is on when the transmit signal is on and the receive signal is off when the transmit signal is off, that the receiver is detecting noise if the received signal remains on when the transmit signal is turned off, and that the object is not present if the receive signal is off whenever the transmit signal is on. An executive scheduler controls the detection control routine.

In this first embodiment, the data source is taken from the lower four bits of a stored memory location. The value of these four bits can be algorithmically altered to form its complement. An eight-bit source is transmitted by first serially transmitting the four-bit data source, complementing the data source, and then transmitting the resulting four bits. It is very unlikely that random optical noise would duplicate this signal. Additionally, the eight-bit data source can be complemented between transmissions.

The second software routine 178 used in the second digital error detection method is illustrated in FIG. 12. The routine 178 of the second method of digital error detection includes a Main Process loop 180 that calls a Scan Sensor sub process 182 and an interval generator or Calculate Pass Target 184 sub process. The Scan Sensor sub process sends, receives and validates serial multi-bit data from the transmitter 112 and receiver 114. The Calculate Pass Target sub process generates a random pass target number equal to or greater than zero and less than sixty-four. The Main Process loop 180 runs continuously and increments a pass count variable for each loop it makes until the pass count variable equals the pass target number. When the pass count variable equals the pass target number, the Main Process loop 180 calls the Scan Sensor sub process 182. The random interval between sensor scans shown in FIG. 11 is random because the generated pass target number is random. The microcontroller generates the pass target number by performing a cyclical redundancy check (CRC) on constantly varying data. A preferred method for generating the pass target number includes performing the following steps: (1) Obtaining a starting binary number or seed "n" from the microcontroller's free running clock, wherein "n" is defined by the equation "0≦n>255;" (2) Forming a sixteen bit data block by multiplying the number "256;" (3) Generating the random number "r" by dividing the data block with a six-bit polynomial divisor, $2^5+2^4+2^2+1$, wherein "r" is defined by the equation "0≦r>64;" (4) Creating a new pseudo-random sixteen bit data block by multiplying the random number "r" by the number "256" and adding the current value of the free running clock; and (5) Returning to Step Three. The execution sequence varies, causing the number of executed instructions and consumed clock cycles to vary as well. Therefore, the pseudo randomization of the data block is achieved in the fourth step where the value of the free running clock is added.

In the second embodiment, a data byte is generated by taking the lower four bits of a memory location (low-order nibble) followed by the upper four bits of a memory location (high-order nibble). The data byte is rotated one bit before each data transmission. The control output is turned on whenever valid data is detected and is turned off whenever invalid data is detected.

Table 1 compares the two methods of digital error detection shown in the timing and flow diagrams of FIGS. 10 and 12 and FIGS. 11 and 13.

A significant portion of the microcontroller time can be spent in the data transmit and receive activity. In addition, transmission via single bit-to-port transfers presents some internal timing problems. One alternative is to use a microprocessor with an on-chip UART (universal asynchronous receiver-transmitter). The UART relieves the microcontroller of all the data transmission essentials. The desired data pattern is simply loaded into the UART and transmitted when desired. The UART can simultaneously receive the returned data into its receive buffer, allowing the data verification to be a simple byte to byte compare. This embodiment is capable of using significantly longer and/or more complex data patterns and using higher transmission rates to further improve noise rejection.

Another embodiment incorporates data line drivers (RS 232 or RS 422) with the transmitter/receiver units so that, with a suitable local power source, the transmitter/receiver units could be mounted at a considerable distance from the microcontroller or microprocessor (up to 4000 feet in the case of RS 422). The communications link in the present invention is over one meter in length. This embodiment could be used as a computer peripheral connected to a standard communications port on a typical personal computer. The detection data pattern could be formed from pure ASCII encoded characters.

Another embodiment adds a multiplexing method to the microprocessor so multiple sensors, each monitoring a sepa-

TABLE 1

| Components of Embodiments | Sweeping Intervals (First Embodiment) | Random Intervals (Second Embodiment) |
|---|---|---|
| Data Transmission | Shift out 4 bits. Calculate the complement. Shift out the complement of the 4 bits. | Shift out 8 bits. Rotate the byte by 1 bit before next transmission. |
| Data Reception | Bits are read serially and compared to the transmitted bit. | Bits are read serially and compared to the transmitted bit. |
| Interval Generation | Set Pass Target to zero. Increment Pass Target after each sensor scan. Reset to zero after 63 sensor scans. | Random Pass Target calculation initially seeded with the product of the system timer and 256. Generate a new pass target after each scan by using the product of the last pass target value and 256 plus the current system timing value. System scan intervals are based on a random number of mail loop passes which randomly varies from 0 to 63. |
| Control Output ON | The control output is turned on whenever valid data is detected during a scan. | The control output is turned on whenever valid data is detected during a scan. |
| Latch Mode | Latch Mode is enabled upon valid data detection and upon the control output being on. | Not used. |
| Control Output OFF | Latch is tested on each scan. Latch failure indicates noise or no container. The control output is turned off whenever there is a latch failure. | The control output is turned off whenever invalid data is detected during a scan. |

The above description illustrates an embodiment of the invention in which valid data is received only after being reflected off of an object. However, this invention anticipates using digital error detection methods with other object proximity detection methods and designs. For example, the device could be designed to receive and verify valid digital data when an object is not present within a predetermined region. It would detect an object when the object blocks the transmitted data.

rate location, could easily be incorporated. More sensors allow the flexibility to adapt to various requirements of different controlled equipment and processes. A single microprocessor could monitor separate and discrete locations, monitor larger predetermined regions, and/or monitor numerous sub-regions within a larger predetermined region.

Another embodiment uses available data receiving IC devices such as the SHARP GP1U57 in lieu of photo transistors in the sensor unit. These devices, also based on infrared light detection, are designed to receive very high frequency pulses of short duration, typically 40,000 Hz for 600 μsec. The transmitted data in this embodiment is sent as a series of high frequency pulses. Advantages of this embodiment include additional resistance to external optical noise and an increase in the sensor's ability to detect objects further from the sensor.

The apparatus and methods of this invention have particular utility used in conjunction with commercial and institutional food service beverage and ice dispensing systems, medical/pharmaceutical dispensing systems, automated manufacturing and production systems, food processing systems, packaging systems, and a variety of other commercial, industrial, municipal and residential systems that utilize one or more mechanical, electronic, optical, or similar sensors to function properly. Additionally, the controller systems of this invention may be used without any sensor. Rather, it can receive an input from a human operator via a keyboard or other input means. The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

That which is claimed is:

1. A proximity detection apparatus for detecting objects within a predetermined region, comprising:
   (a) a transmitter having an axis of projection oriented toward said predetermined region;
   (b) a receiver having an axis of reception oriented to intersect said axis of reception in said predetermined region;
   (c) a microcontroller electrically connected to said transmitter and to said receiver; and
   (d) means for providing electrical power to said microcontroller, said transmitter, and said receiver, wherein said microcontroller electrically produces transmitted data bursts to said transmitter, said transmitter receives said transmitted data bursts and emits corresponding optical bursts toward said predetermined region, said optical bursts reflect off of said object as return optical bursts if said object is within said predetermined region, said receiver detects said return optical bursts and electrically transmits corresponding received data bursts to said microcontroller, and said microcontroller compares said transmitted data bursts to said received data bursts and verifies that said object is within said predetermined region.

2. The proximity detection apparatus of claim 1, wherein said transmitted data bursts are produced asynchronously.

3. The proximity detection apparatus of claim 2, wherein a time interval between successive transmitted data bursts is gradually increased during a predetermined periodic time band.

4. The proximity detection apparatus of claim 2, wherein a time interval between successive transmitted data bursts is random.

5. The proximity detection apparatus of claim 1, wherein said transmitter includes one or more light emitting diodes that emit said corresponding optical bursts and said receiver includes one or more photo transistors that detect said return optical bursts and electrically transmit said received data bursts corresponding to said return optical bursts.

6. The proximity detection apparatus of claim 5, wherein said receiver includes an amplifier for converting low level signals received from said photo transistors to high level signals.

7. The proximity detection apparatus of claim 5, wherein said receiver includes a comparator having an adjustable threshold, said comparator receiving variable-level data and driving an output line at logic levels, said output line being electrically connected to said microcontroller.

8. The proximity detection apparatus of claim 1, wherein a remote sensor unit functions as said transmitter and said receiver, said sensor unit being electrically connected to said microcontroller and being capable of asynchronously and bidirectionally communicating with said microcontroller, said sensor unit including:
   (a) a light emitting diode functioning as said transmitter;
   (b) a high speed receiver switch controlling said light emitting diode;
   (c) two photo transistors functioning as said receiver;
   (d) an amplifier converting low-level signals produced by said photo transistors into higher level signals; and
   (e) a comparator having a lower threshold, said comparator receiving variable-level data from said amplifier and driving an output data line at logic levels, said output line being electrically connected to said microcontroller.

9. The proximity detection apparatus of claim 1, further comprising a software program operating within said microcontroller, wherein said software program produces said transmitted data burst, reads said received data burst, and verifies said received data burst against said transmitted data burst.

10. The proximity detection apparatus of claim 9, wherein said software program is designed to manage steps performed by said software program for each of said transmitted data bursts while operating in said scan sensor module, said steps including:
   (a) building a data byte comprised of eight bits;
   (b) serially shifting said data byte one bit at a time from a suitable output port of said microcontroller, said shifting of said data byte occurring at a predetermined data rate;
   (c) serially reading said received digital data bursts on a bit by bit basis from a suitable input port of said microcontroller; and
   (d) verifying said received digital data bursts against said transmitted digital data bursts.

11. The proximity detection apparatus of claim 10, wherein said step of building an data byte includes the steps of retrieving a four-bit segment from a memory location and appending the complement of said four-bit segment to said four-bit segment.

12. The proximity detection apparatus of claim 11, wherein said data byte and the complement of said data byte are alternately transmitted as said electrically transmitted data bursts.

13. The proximity detection apparatus of claim 10, wherein said step of building a data byte includes the step of retrieving said data byte from a memory location.

14. The proximity detection apparatus of claim 10, wherein said step of building an data byte includes the step of rotating said bits of said data byte.

15. The proximity detection apparatus of claim 10, wherein said software program asynchronously adjusts time intervals between transmissions of said digital data bursts.

16. The proximity detection apparatus of claim 15, wherein said software program gradually increases said time intervals while sweeping a predetermined time band.

17. The proximity detection apparatus of claim 15, wherein said software program randomly adjusts said time intervals.

18. The proximity detection apparatus of claim 9, wherein said software program verifies said received data burst against said transmitted data burst by initializing an eight-bit counter to zero before each transmission and incrementing said counter for each valid reception, whereby said received digital data burst is verified against said transmitted eight-bit data byte only if said counter equals eight.

19. The proximity detection apparatus of claim 9, wherein said software program has a latch module, said software program changes from operating in said scan sensor module to said latch module when said software program detects said object by verifying said received data bursts against said transmitted data bursts, said latch module differing from said scan sensor module in that said program transmits a steady state signal rather than said transmitted data burst causing said transmitter to emit a continuous optical beam rather than said optical burst.

20. The proximity detection apparatus of claim 19, wherein said software program operating in said latch module farther performs steps to identify whether said object is absent or present and whether said receiver is detecting optical noise, said steps including:
(a) comparing a received signal to said steady state transmitted signal when said transmitted signal is on, whereby said object is absent if said received signal is off in which case said software program enters said scan sensor module; and
(b) comparing said received signal to said steady state transmitted signal when said transmitted signal is switched on, off and on again, whereby said receiver is detecting optical noise if said received signal is on when said transmitted signal is switched off in which case said software program enters said scan sensor module, and said object is present if said receiver signal is on whenever said transmitted signal is on and said received signal is off whenever said transmitted signal is off in which case said software remains in said latch module.

21. The proximity detection apparatus of claim 1, further comprising a second receiver electrically connected to said microcontroller, said second receiver having an axis of reception intersecting said axis of projection of said transmitter, wherein said second receiver is positioned and arranged with respect to said transmitter and said receiver to create a larger predetermined region in which to detect said object.

22. The proximity detection apparatus of claim 1, wherein said receiver and said transmitter have a line driver, said line driver allowing said receiver and said transmitter to be positioned further from said microcontroller than without said line driver.

23. The proximity detection apparatus of claim 1, further including an interface circuit designed to control equipment, wherein said microcontroller emits output signals to said interface circuit, and said interface circuit emits output signals to said equipment based upon whether said object is detected within said predetermined region.

24. The proximity detection apparatus of claim 23, wherein said interface circuit includes load relays.

25. The proximity detection apparatus of claim 1, wherein a microprocessor replaces said microcontroller.

26. A proximity detection apparatus for detecting objects within a predetermined region, comprising:
(a) a transmitter having an axis of projection oriented toward said predetermined region, said transmitter including one or more light emitting diodes;
(b) a receiver having an axis of reception oriented to intersect said axis of reception in said predetermined region, said receiver including one or more photo transistors;
(c) a microcontroller electrically connected to said transmitter and to said receiver; and
(d) means for providing electrical power to said microcontroller, said transmitter, and said receiver;
(e) a software program operating within said microcontroller; and
(f) an interface circuit designed to control equipment, wherein, said software program operating within said microcontroller asynchronously produces transmitted data bursts to said transmitter, said transmitter receives said transmitted data bursts and emits corresponding optical bursts toward said predetermined region, said optical bursts reflect off of said object as return optical bursts if said object is within said predetermined region, said receiver detects said return optical bursts and electrically transmits corresponding received data bursts to said microcontroller, said software program within said microcontroller reads and compares said received data bursts to said transmitted data bursts and verifies that said object is within said predetermined region, and emits an output signal to said interface circuit upon verifying said object is within said predetermined region.

27. A computer program operating within a proximity detection apparatus for detecting objects within a predetermined region, said program having a searching module in which said program performs steps to probe said predetermined region for said object, said steps comprising:
(a) asynchronously producing digitally encoded transmitted data bursts to a transmitter, said transmitter emitting optical data bursts corresponding to said transmitted data bursts toward said predetermined region, said optical data bursts reflect off of said object as return optical data bursts toward a receiver if said object is present in said predetermined region, said receiver transmitting received data bursts corresponding to said return optical data and to said transmitted data bursts;
(b) reading said received data bursts; and
(c) verifying that said received data bursts exactly duplicate said transmitted data bursts.

28. The computer program of claim 27, wherein said step of asynchronously producing data bursts includes the steps of resetting a predetermined time interval between said transmitted data bursts and gradually increasing said time interval while sweeping a predetermined periodic time band.

29. The computer program of claim 27, wherein said step of asynchronously producing data bursts includes the step of generating a random time interval using a randomizing function derived by a cyclical redundancy check on constantly varying data.

30. The computer program of claim 27, further comprising a latch module which, upon said program verifying said object is within said predetermined region, transmits a steady-state signal rather than said transmitted data bursts, toggles said steady-state signal on and off, reads a received signal resulting from the toggled steady-state signal, and compares said received signal against said steady-state signal to determined if said object is present or absent from said predetermined region or if said receiver is detecting optical noise.

31. A method for detecting objects within a predetermined region, said method comprising the steps of:

(a) asynchronously producing digitally encoded transmitted data bursts;

(b) converting said transmitted data bursts into optical data bursts corresponding to said transmitted data bursts;

(c) emitting said optical data bursts to said predetermined region;

(d) detecting return optical data bursts that reflect off of said object if said object is in said predetermined region;

(e) converting said return optical data bursts into received data bursts;

(f) reading said received data bursts; and (g) verifying said received data bursts against said transmitted data bursts,
wherein said object is present in said predetermined region if said received data bursts exactly duplicate said digitally encoded transmitted data bursts.

32. The method for detecting objects within a predetermined region of claim 31, wherein the step of asynchronously producing digitally encoded transmitted data bursts includes the steps of resetting a predetermined time interval between said transmitted data bursts and gradually increasing said time interval while sweeping a predetermined periodic time band.

33. The method for detecting objects within a predetermined region of claim 31, wherein the step of asynchronously producing digitally encoded transmitted data bursts includes the steps of generating a random time interval using a randomizing function based on a cyclical redundancy check on constantly varying data.

34. The method for detecting objects within a predetermined region of claim 31, further including, upon detecting said object in said predetermined region, the steps of:

(a) ceasing to produce said digitally encoded transmitted data bursts;

(b) transmitting a steady-state signal and a corresponding optical signal;

(c) toggling said steady state signal and said corresponding optical signal on and off; and (d) determining whether said object is absent or present or whether said receiver is detecting noise by comparing received signals against said steady-state signals.

* * * * *